United States Patent [19]

Kirchweger et al.

[11] Patent Number: 4,610,326

[45] Date of Patent: Sep. 9, 1986

[54] AIR COOLING ARRANGEMENT FOR ENCAPSULATED VEHICLE ENGINE

[75] Inventors: Karl Kirchweger; Franz Knopf; Gerhard Thien, all of Graz, Austria

[73] Assignee: AVL Gesellschaft für Verbrennungskraftmaschinen und Messtechnik mbH, Prof.Dr.Dr.h.c. Hans List, Graz, Austria

[21] Appl. No.: 597,425

[22] Filed: Apr. 6, 1984

[30] Foreign Application Priority Data

Apr. 8, 1983 [AT] Austria .................. 1267/83
Jun. 28, 1983 [AT] Austria .................. 2370/83
Aug. 25, 1983 [AT] Austria .................. 3040/83

[51] Int. Cl.[4] .......................... B60K 11/08
[52] U.S. Cl. .................. 180/68.1; 123/41.62; 123/41.7; 180/69.22; 181/204; 181/224
[58] Field of Search ............ 180/68.1, 68.2, 68.3, 180/69.22; 181/204, 224, 240, 256; 123/198 E, 41.7, 41.62

[56] References Cited

U.S. PATENT DOCUMENTS 2,886,120 5/1959 Broell .................. 180/68.1
3,696,730 10/1972 Masuda .................. 180/68.1
4,164,262 8/1979 Skatsche .................. 180/68.1
4,203,407 5/1980 Fachbach .................. 181/204
4,455,971 6/1984 Kirchweger .................. 181/204

FOREIGN PATENT DOCUMENTS 2703227 8/1978 Fed. Rep. of Germany ..... 180/68.1
872738 6/1942 France .................. 180/68.1
659053 12/1963 Italy .................. 180/68.1

Primary Examiner—John J. Love
Assistant Examiner—Everett G. Diederiks, Jr.
Attorney, Agent, or Firm—Watson, Cole, Grindle & Watson

[57] ABSTRACT

A water-cooled internal combustion engine powering the vehicle is mounted in an engine compartment comprising a sound-insulating capsule. Independent of and additionally to any possible blower ventilation of the capsule at least one separate inlet opening into the capsule is connected to an intake opening situated in an area which is exposed to dynamic pressure when the vehicle is in motion. The front cross-member may be provided with an intake opening open in the direction of motion as well as with a sound-absorbing lining, and the inflowing cooling air may be fed into the capsule via the adjacent longitudinal beams of the vehicle frame.

11 Claims, 12 Drawing Figures

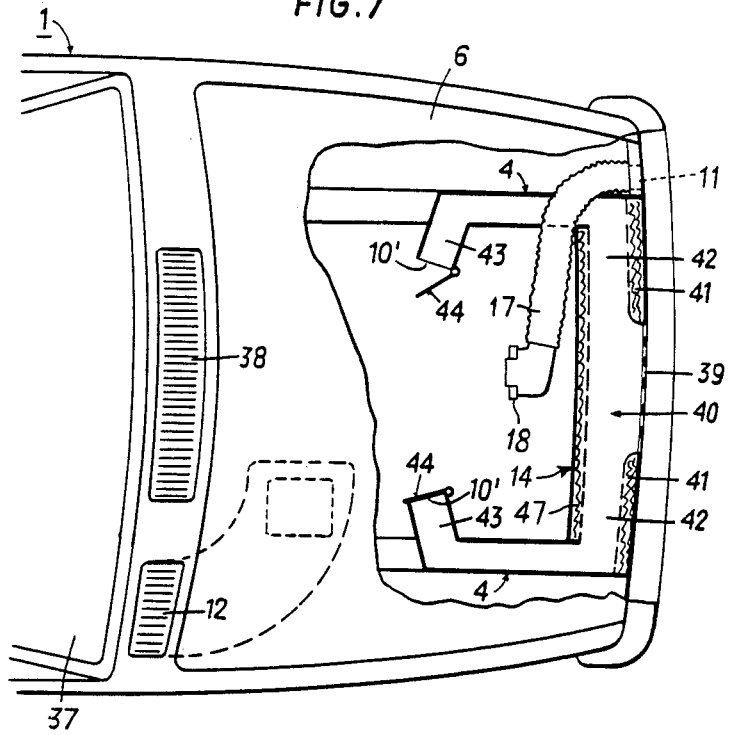
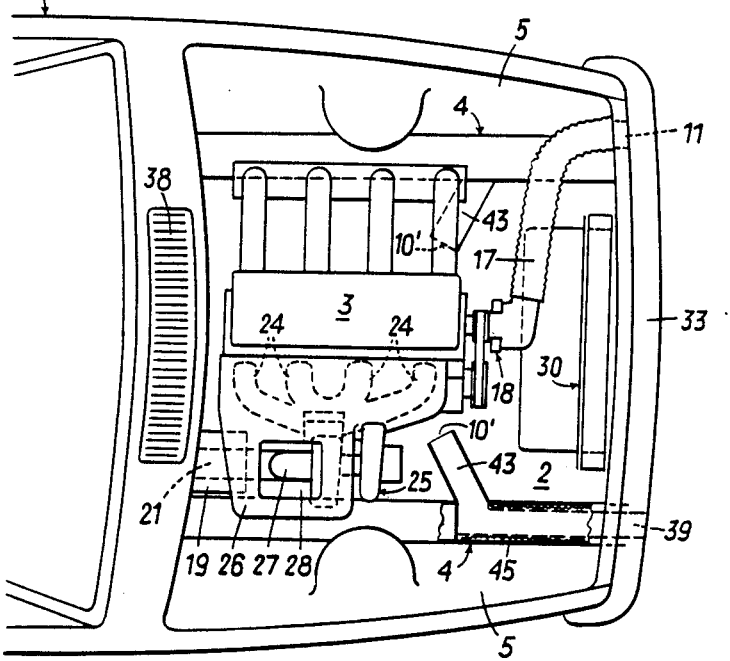

AIR COOLING ARRANGEMENT FOR ENCAPSULATED VEHICLE ENGINE

RELATED APPLICATION

This application relates to U.S. Ser. No. 597,420, filed Apr. 6, 1984 and commonly owned herewith.

BACKGROUND OF THE INVENTION

This invention relates to a motor vehicle which is powered by a water-cooled internal combustion engine mounted in an engine compartment, the latter being complemented by additional encapsulating elements sealed against parts of the frame and body of the vehicle, to form a sound-insulating capsule comprising sound-absorbing inlets and outlets for the cooling air of the capsule.

DESCRIPTION OF THE PRIOR ART

Such vehicles have been described before, e.g., in U.S. Pat. No. 4,455,971 or in Austrian Patent Specification No. 369 700; they are usually provided with blowers whose operation is coupled to that of the engine, and which provide for the ventilation of the interior of the sound-insulating capsule necessary during operation of the internal combustion engine, by taking in cooling air through the inlet openings. The outlet openings of the known types of vehicles are always located in the area of the hot exhaust system or of the exhaust pipe, directing the flow of cooling air from the cooler towards the hotter parts of the engine in operation.

The above types of combustion engine are characterized by the disadvantage that specific cooling of the interior of the sound-insulating capsule, or precise directing of the flow of cooling air within the capsule is rather difficult to establish since an unconstrained choice of the location of the inlet opening, or of several such inlet openings, is not possible because of the considerable design efforts and costs involved in the positioning and powering of the blower at this inlet opening, or at several such inlet openings, all of which would have to be provided with a separate blower or would at least have to be situated within the operating range of a blower (cf., e.g., the aforementioned German laid-open print No. 32 25 347).

SUMMARY OF THE INVENTION

It is an object of the present invention to design a vehicle of the above type such that the ventilation of the sound-insulating capsule may be improved without affecting assembly and maintenance, by specifically directing the flow of cooling air within the capsule, keeping additional design and construction expenses at a minimum.

According to the present invention this aim is achieved by connecting—independently of and additionally to any possible blower ventilation of the capsule—at least one separate inlet opening for the cooling air of the capsule with an intake opening which is placed at a point of the vehicle exposed to the dynamic pressure developing when the vehicle is in motion. In this simple way the effect of the airstream generated by the moving vehicle is utilized for ventilation of the capsule, which will permit any number of inlet openings to be located at the capsule whereever desirable, without any additional expense for the installation and driving of a blower.

For a motor vehicle with a front engine and a front cross-member connecting the front ends of the longitudinal subframe beams integrated into the walls of the capsule, a further embodiment of the invention proposes that the front cross-member, which should be configured as an essentially closed intake housing, be provided with an intake opening open in the direction of motion, and that a sound-absorbing lining be provided in this intake housing, and that the intake housing be connected to at least one of the longitudinal subframe beams via an opening, and that this beam should take cooling air for the capsule to the inlet opening. In this simple way existing frame elements are being complemented and turned into components for the feed of cooling air into the capsule, which is an economical solution in view of the usual lack of space in a modern engine compartment.

According to another embodiment of the present invention it will be of particular advantage if the inlet opening(s) is/are located in the vicinity of parts or auxiliary assemblies of the internal combustion engine requiring special cooling. In this simple manner heat-sensitive components, e.g., oil sump, generator, fuel pump, etc., may be cooled efficiently without involving any particular cost or design effort.

In a further embodiment of the present invention, a motor vehicle with a separate blower for ventilation of the capsule and intake or inlet opening(s) independent of the blower, this (these) opening(s) being (are) provided with a back valve which will prevent the escape of cooling air from the capsule in this area if the respective dynamic pressure is surpassed by the pressure within the capsule. If the engine is running while the vehicle itself is at a standstill ventilation of the capsule is solely effected by the blower in this variant, the back valves which are closed due to the pressure increase within the capsule caused by the blower, preventing the loss of cooling air via the intake or inlet openings which are not provided with a blower. This applies until the dynamic pressure at the intake/inlet openings has reached a certain level depending on the performance of the additional blower for ventilation of the capsule, and on the pre-loading of the back valves.

In this context it will be of special advantage if the back valve is configured as a conventional spring-loaded flap which may be made of various materials; if a rubber or plastic material is used the flap may incorporate the hinging and loading mechanisms in various known ways.

In small passenger cars with transversely mounted front engines which usually require a separate blower for ventilation of the capsule in the lower speed ranges or at a standstill of the vehicle, it is often quite difficult to introduce an inlet pipe leading to this blower as there is very little extra space in the engine compartment, and the possible drive shafts at the front of the combustion engine are located immediately at the side-walls of the engine compartment or the sound-insulating capsule, or are bordering on auxiliary assemblies, e.g., battery, rinse-water container for the windshield-wipers, fuse boxes, etc., which will leave no space for inlet pipes or ducts leading into this blower. In a further embodiment of the present invention sufficient ventilation of the capsule is ensured even for compact designs with the engine mounted transversely at the front of the vehicle, by providing a separate blower for the capsule in the vicinity of an inlet opening of a subframe beam which is powered by the engine or an auxiliary assembly. Thus the inlet openings in the area of the subframe beams are effectively employed for feeding cooling air into a special blower positioned next to one of these inlet openings; because of the transverse position of the engine either one of the rotating shafts (crankshaft, camshaft, control gear shaft) may be used directly for driving this blower, or the blower may be driven by a V-belt drive, etc., which is powered by the engine. In any case, there will be no need for a separate feed pipe leading to the blower for ventilation of the capsule and its inlet housing centred on the blower entrance and a corresponding muffler, since these components are already provided, partly by utilizing existing parts of the frame.

Another embodiment of the present invention proposes that the fan of the radiator/fan assembly of the internal combustion engine be placed in front of the radiator (facing forwards), and that it be thermostatically controlled and driven independently of the prevailing operational state of the engine, and that an air intake duct be positioned between the fan and the radiator which is at least partly closed, and that this air intake duct be provided with a side opening which is connected via a feed pipe with at least one of the longitudinal subframe beams having an inlet opening, thus ensuring sufficient ventilation of the capsule, even if there is very little extra space in the engine compartment. The fan which is frequently placed in front of the radiator in today's cars and may be driven by an eletromotor, and which is usually surrounded by an air intake housing or duct up to the radiator in its rear in order to enhance efficiency, will produce excess pressure in front of the radiator or in the air intake housing, thus propelling cooling air through the radiator. In this variant of the invention air is diverted from this pressurized area between fan and radiator for force-ventilating the sound-insulating capsule if necessary, the feed to the inlet opening proper being provided via at least one of the longitudinal subframe beams integrated into the walls of the capsule. This will eliminate the need for an additional blower for ventilation of the capsule, which would be comparatively expensive, while preventing the capsule interior, or rather the components mounted within the capsule, from overheating during operational states of the engine in which the dynamic pressure in front of the vehicle or of the opening into the intake housing is not high enough to ensure adequate ventilation of the capsule. Due to the utilization of the existing fan and of the longitudinal subframe beams which have been conceived such as to permit ventilation of the capsule, the only additional component to be provided will be the pipe leading from the side opening in the air intake duct to the subframe beam, which will cut expenses considerably. The fan itself and its drive may have to be designed somewhat larger, which is of little consequence, however, considering that the electromotor of the radiator/fan assembly of the engine of a passenger car has a power requirement of approximately 100 to 200 W, which will be increased only slightly by the added requirements of the present invention.

Yet another embodiment of the invention proposes that the flow paths for ventilation of the capsule by dynamic pressure which are independent of the side opening or the feed pipe, be provided with back valves, e.g., spring-loaded flaps. In this way the cooling air cannot escape from the capsule via these flow paths when the sound-insulating capsule is force-ventilated via the feed pipe branching off from the air intake duct of the fan. As it is commonly aimed that the cooling air from the capsule should flow off via outlet openings located in the area of the hot exhaust system in order to achieve sufficient cooling of this area at the same time, the above solution is particularly favorable.

In a still further embodiment of the invention provisions may be made for at least one temperature sensor to be placed in those areas of the internal combustion engine or its auxiliary assemblies requiring special cooling, such that—in addition to a temperature sensor in the cooling water—the fan is turned on or off when a given temperature is exceeded. This will ensure that the fan in front of the radiator is turned on/off not only, as is common, in accordance with the temperature of the cooling water but also with the temperature prevailing at points inside the capsule requiring special cooling, which is especially favorable for the cooling of the capsule as a stream of air is employed here which is diverted from the pressurized area behind the fan.

DESCRIPTION OF THE DRAWINGS

The following is a more detailed description of the present invention as illustrated by the enclosed drawings in which FIG. 7 presents a view along arrow VII in FIG. 5, with the engine omitted, FIG. 8 presents a view corresponding to that of FIG. 7 (with the engine hood removed) of another variant of the invention.

Figure 1:
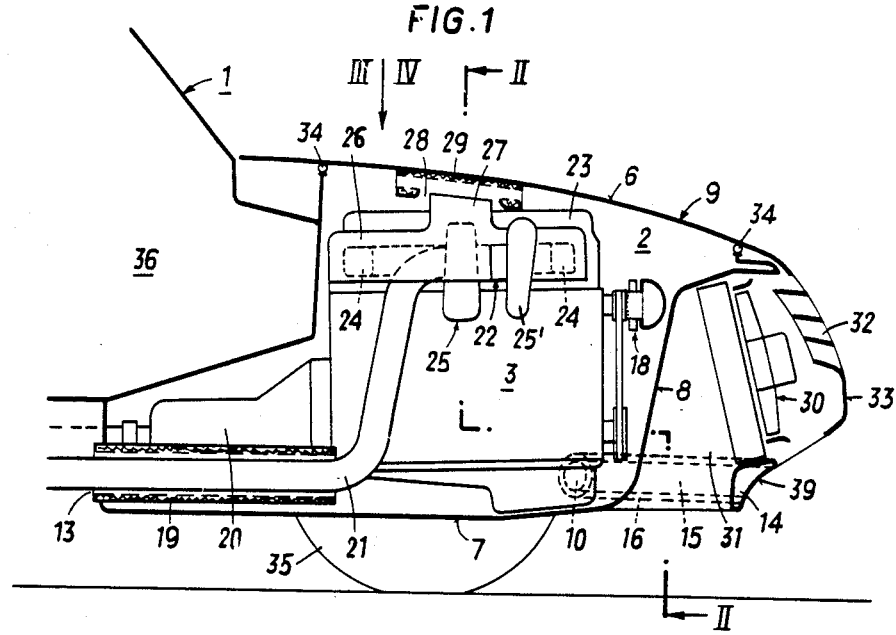
FIG. 1 shows a partial vertical section through a motor vehicle according to the invention, in a schematic representation.
Figure 2:
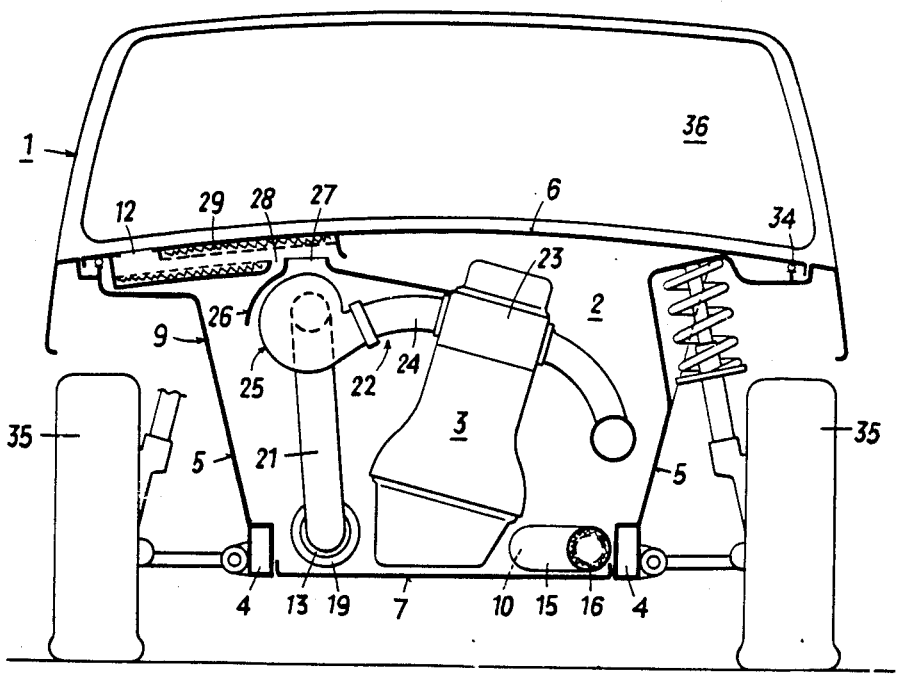
FIG. 2 presents a partial section along line II—II in FIG. 1.
Figure 3:
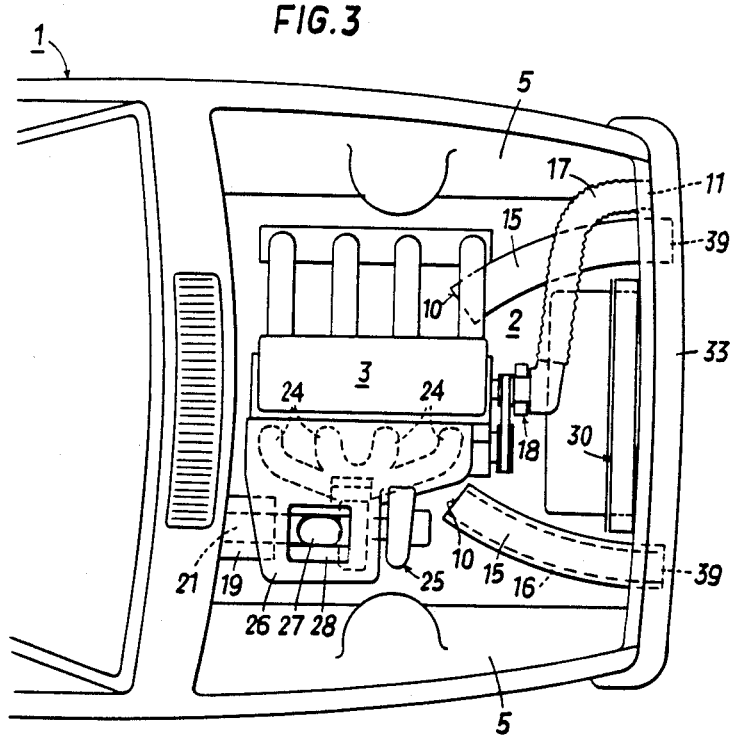
FIG. 3 presents a view along arrow III in FIG. 1, with the engine hood removed.
Figure 4:
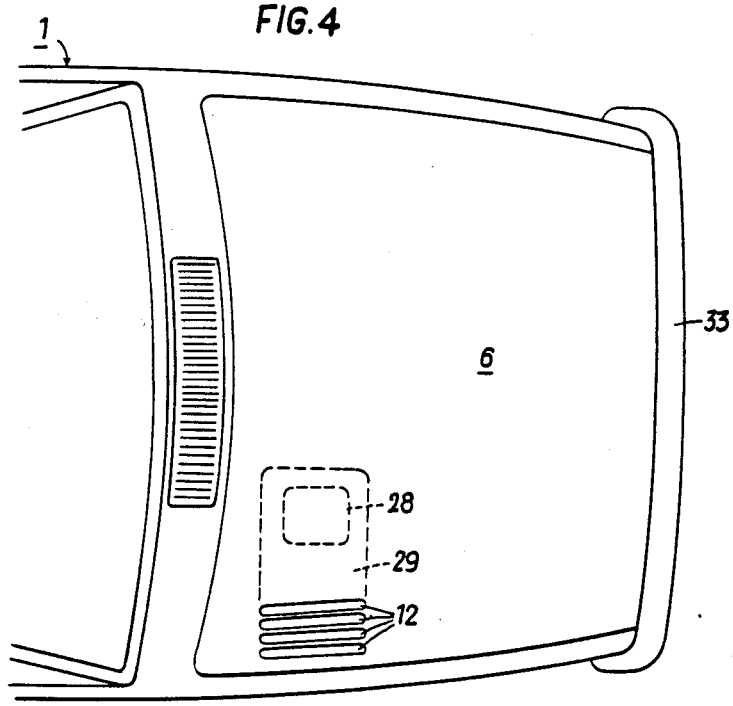
FIG. 4 presents a view corresponding to that of FIG. 3, with the engine hood closed.

A motor vehicle presented in FIGS. 1 to 4 is shown as a passenger car powered by an internal combustion engine 3 which is mounted in an engine compartment 2 at the front of the car. The engine compartment 2 is completed by additional encapsulating elements, such as bottom 7 and front baffle plate 8, which are sealed against such parts of the frame or body as longitudinal subframe beams 4, wheelguard covers 5 or engine hood 6, to form an enclosed soundinsulating capsule 9. The capsule 9 has inlet openings 10, 11 and outlet openings 12, 13 which are insulated in order to prevent the escape of air-borne sound, and are used for ventilation of the capsule.

In the variant shown here the inlet openings 10 are located at the end opening into the capsule interior of two curved ducts 15 originating at a front cross-member 14 of the vehicle 1, the other end of these ducts at the side of the cross-member being provided with intake openings 39 which are exposed to the dynamic pressure generated by the vehicle in motion. A sound-absorbing lining 16 will prevent the escape of air-borne sound from the capsule, the curved shape of the ducts 15 impeding the direct escape of noise. In this variant the inlet opening 11 which is also located at a point at the front of the motor vehicle 1 where it is subject to the dynamic pressure generated by the vehicle, is connected via a flexible hose 17 with a blower 18 directly powered by the internal combustion engine 3, which will supply the capsule with a sufficient amount of cooling air, even if the vehicle is at a standstill while the engine is running. Because of the suction effect of the blower 18 this inlet opening 11 could also be placed somewhere else.

The outlet opening 13 is designed as a ring-shaped gap provided with an absorption muffler 19 and running around the exhaust pipe 21 leading out of the capsule 9 in the vicinity of the gearbox 20, such that the exhaust pipe 21 penetrates the capsule without touching it. Where the heated air rises from the exhaust system 22 of the combustion engine 3—which in this variant includes an exhaust turbocharger 25 in addition to the manifold 24 flange-mounted to the cylinder head 23, and the exhaust pipe 21—a cover 26 without a bottom is provided as a separate exhaust casing offering a roof-like shield at least to the parts of the exhaust system 22 next to the cylinder head, which cover is attached to the combustion engine 3, or rather to the exhaust system 22 in a manner not shown. This cover 26 has a short outlet pipe 27 which opens without any direct contact into an absorption muffler 29 located at the hinged engine hood 26, leaving open an essentially ring-shaped gap 28. The absorption muffler 29 is connected with the outlet opening 12 which, as in the variant shown here, may be situated in an area in which a partial vacuum develops when the vehicle is in motion; this will create a suction effect via the outlet opening 12 and the absorption muffler 29 attached to it.

Other parts of the motor vehicle, such as radiator fan assembly 30 at the front end of the vehicle, air outlet duct 31, radiator grille 32, bumper 33, gaskets 34 of the engine hood, wheels 35 including their suspension, car interior 36, etc., are mentioned here for the sake of completeness only.

If the vehicle 1 is at a standstill the engine compartment 2 or the interior of the sound-insulating capsule 9 is ventilated by a blower 18 which takes in air through the inlet opening 11 and delivers it into the open via the outlet openings 12, 13. To a certain degree the air rising from the heated exhaust system 22 and flowing into the open through the outlet opening 12 also contributes towards a better ventilation. If the vehicle is in motion the dynamic pressure present at the front intake openings 39 of the ducts 15 provides for additional ventilation by feeding air into the capsule via the inlet openings 10 which may be located in the vicinity of any parts of the combustion engine requiring special cooling, e.g., the oil sump, the fuel pump, or the generator. Furthermore, positioning the outlet opening 12 in an area of the outer wall in which a partial vacuum develops when the car is in motion, will produce a kind of suction effect which also serves to improve ventilation of the capsule.

These simple techniques will ensure adequate ventilation of the interior of the sound-insulating capsule, both if the vehicle is at a standstill and if it is in motion.

Deviating from the arrangement discussed before it would also be possible to do without the blower 18 for ventilation of the capsule, provided that the heated air rising in the cover 26 will guarantee sufficient ventilation even if the vehicle is at a standstill while the engine is running. Components such as the compressor 25' of the turbocharger, or control devices of an exhaust gas recycling system, not shown here, which should be protected from overheating, are placed outside the roof-type cover 26. This will present no problem as the cover does not have a bottom.

Figure 5:
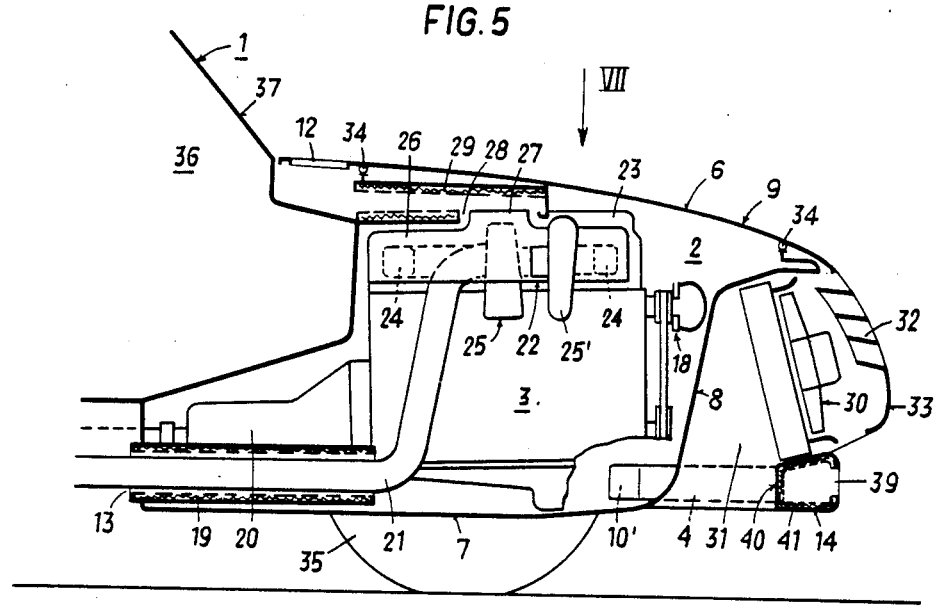
FIG. 5 presents another variant of the invention, the view corresponding to that of FIG. 1.
Figure 6:
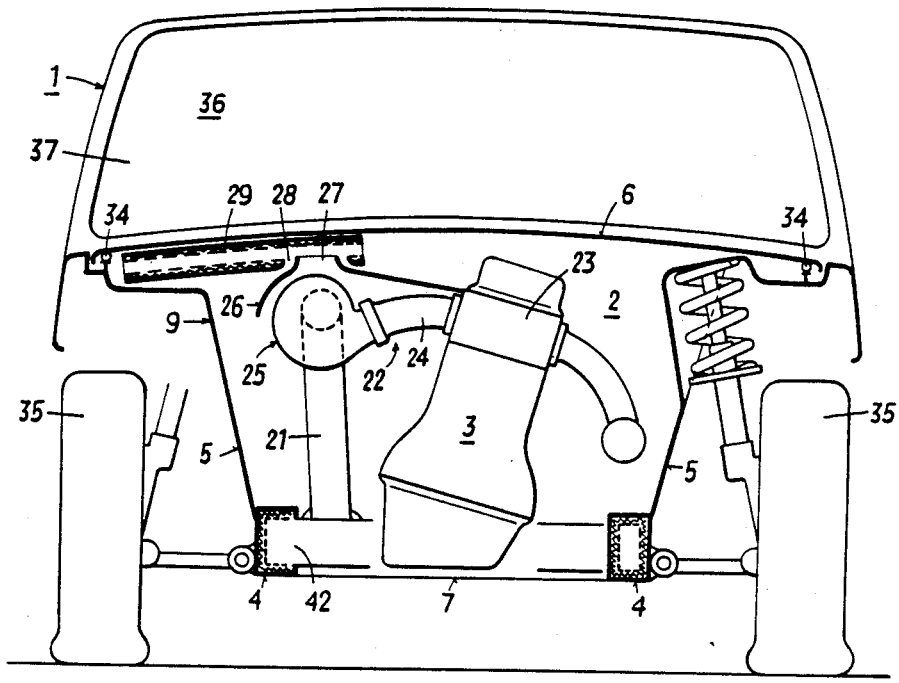
FIG. 6 presents a section corresponding to that of FIG. 2, through the variant according to FIG. 5.

The variant presented in FIGS. 5 to 7 differs from that in FIGS. 1 to 4 in two respects only:

(a) The outlet opening 12 is not located on the hinged engine hood 6 but in the area between the hood 6 and the windshield 37, next to the intake 38 for ventilation of the car interior 36, which will only require a different design and manner of fastening of the absorption muffler 29.

(b) The front cross-member 14 is provided here with a wide intake opening 39 open in the direction of motion, and is configured as a closed intake housing 40. This intake housing 40 is provided with a sound-absorbing lining 41. Besides, the intake housing 40 is connected with the longitudinal subframe beams 4 of the vehicle frame via openings 42, such that these beams 4 will feed cooling air into the inlet openings 10' when the vehicle is in motion, utilizing the dynamic pressure at the intake opening 39. The inlet openings 10' are located on pipe pieces 43 issuing from the beams 4, and are provided with spring-loaded flaps 44, as shown in FIG. 7. The flaps 44 will act as back valves, preventing the escape of cooling air from the capsule via the feed openings 10', which otherwise would be possible if the dynamic pressure was lower than the pressure prevailing inside the capsule.

For a discussion of any other details please refer to the description of FIGS. 1 to 4; identical parts have identical reference numbers. For clarity's sake the combustion engine itself is left out in FIG. 7.

The variant according to FIG. 8 essentially is a combination of the two variants discussed before. The cover 26 of the exhaust system and the location of the corresponding outlet opening (not shown here) are the same as in the variant shown in FIGS. 1 to 4; the feed of cooling air to the capsule via the longitudinal subframe beams 4, or rather the pipe pieces 43 issuing from these beams, into the inlet openings 10', which is supported by the prevailing dynamic pressure, corresponds to that of the variant presented in FIGS. 5 to 7, although the variant of FIG. 8 does not include separate back valves at the inlet openings 10'. Another deviation from FIG. 7 is that the beams 4 in FIG. 8 have a sound-absorbing lining 45 which may be provided either in addition to the sound-insulated intake housing 40 (FIG. 7) or instead of it.

For any other details the same applies as above; identical parts again are given identical reference numbers.

In addition to the variants shown and described above, the intake openings for feeding cooling air into the capsule could also be located at any other point of the vehicle, provided that they are exposed to the dynamic pressure of the air stream generated by the moving vehicle. The number and location of inlets connected with the intake openings is variable, depending on the respective cooling requirements, and may certainly differ from what is indicated in the variants discussed here.

Figure 9:
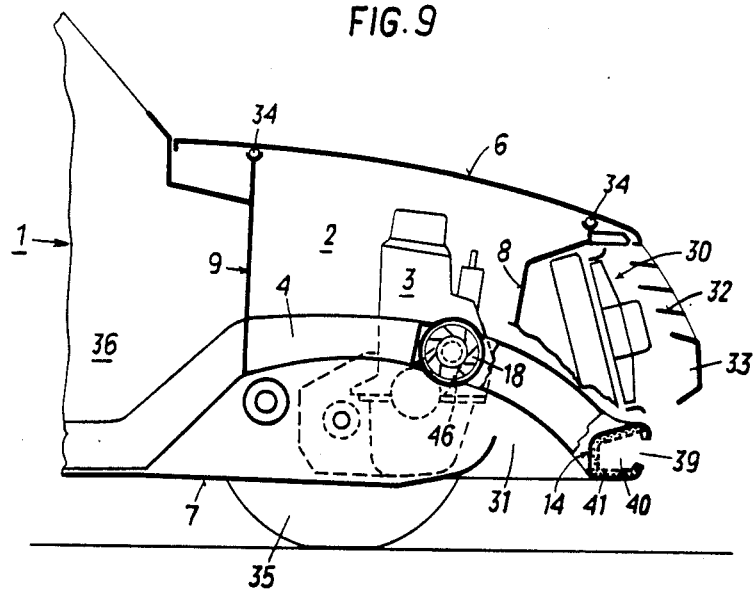
FIG. 9 shows a partial vertical section through yet another variant, in a schematic representation.
Figure 10:
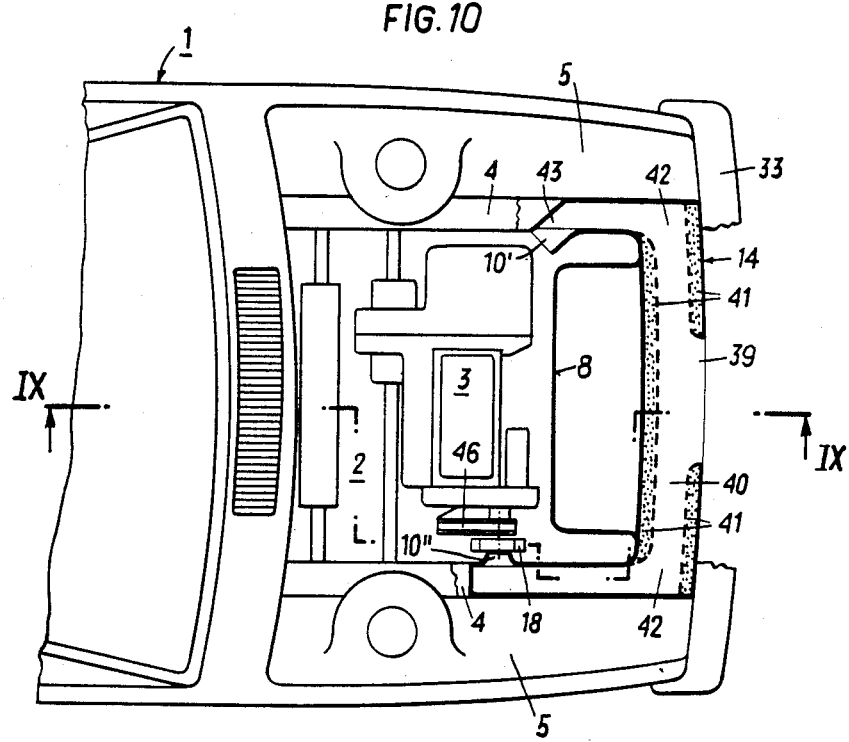
FIG. 10 presents a view of the vehicle according to FIG. 9 from above, with the engine hood removed.

The vehicle 1 presented in FIGS. 9 and 10 again comprises a passenger car powered by an internal combustion engine 3 which is transversely mounted in an engine compartment 2 at the front of the car. The engine compartment 2 is completed by additional encapsulating elements, such as the bottom 7 and the front baffle plate 8, which are sealed against such parts of the frame or body as the longitudinal subframe beams 4, the wheel-guard covers 5 or the engine hood 6, to form an enclosed sound-insulating capsule 9. The capsule 9 has inlet openings 10′, 10″ which are insulated in order to prevent the escape of air-borne sound and are used for ventilation of the capsule.

The front cross-member 14 is provided with a wide intake opening 39 open in the direction of motion, and is configured as a closed intake housing 40. This intake housing 40 is provided with a sound-absorbing lining 41. Moreover, the intake housing 40 is connected to the longitudinal subframe beams 4 of the vehicle frame via openings 42, such that these beams will feed cooling air into the inlet openings 10′, 10″ when the vehicle is in motion, utilizing the dynamic pressure at the intake opening 39.

The inlet opening 10′ at the left-hand side of the vehicle 1 (facing forwards) is located on a piece of pipe 43 issuing from the beam 4, and could be provided with a back valve, e.g., with a kind of spring-loaded flap, in a manner not shown here.

The inlet opening 10″ at the right-hand side of the vehicle 1 (facing forwards) is directly connected to a blower 18 for cooling the capsule which is driven by a V-belt drive 46 from the front end of the internal combustion engine 3 facing the inlet opening 10″, and which will feed cooling air into the capsule via the intake housing 40 and the longitudinal subframe beam 4 if the vehicle is at a standstill with the engine running, or if it is moving slowly.

Deviating from the variant shown it would also be possible to additionally provide the beams 4 with some sound-absorbing material as far as to the inlet openings 10′, 10″; given a suitable position of the combustion engine 3, or rather the beams 4, the blower 18 cooling the capsule might be driven directly off one of the rotating shafts of the internal combustion engine.

Again, other parts of the motor vehicle, such as the radiator fan assembly 30 at the front end of the vehicle, the air outlet duct 31, the radiator grille 32, the bumper 33, the gaskets 34 of the engine hood, the wheels 35 including their suspension, the car interior 36, etc., are mentioned here for the sake of completeness only.

This type of vehicle design will provide for a sufficient ventilation by dynamic pressure of the capsule, even at the higher vehicle speeds, which is achieved in a simple manner and largely by using existing parts of the vehicle frame, in addition to simplifying the incorporation of the blower required for ventilating the capsule when the vehicle is at a standstill or moving slowly, and the feed of cooling air into this blower, by using parts of these frame components which have already been modified for the feeding of air.

Figure 11:
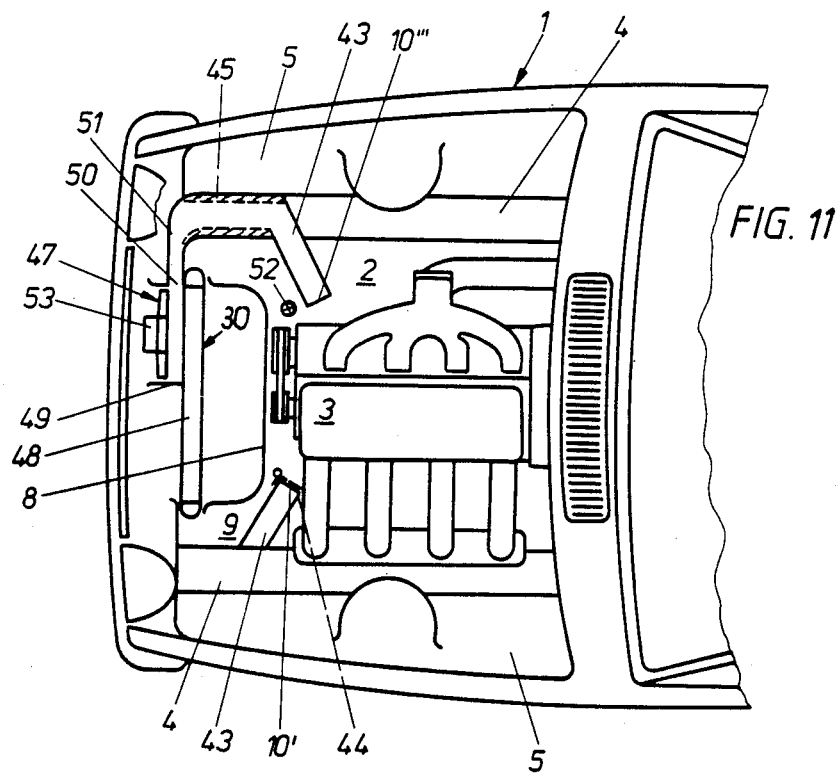
FIG. 11 presents a partial view from above of another variant of the invention, with the engine hood removed.
Figure 12:
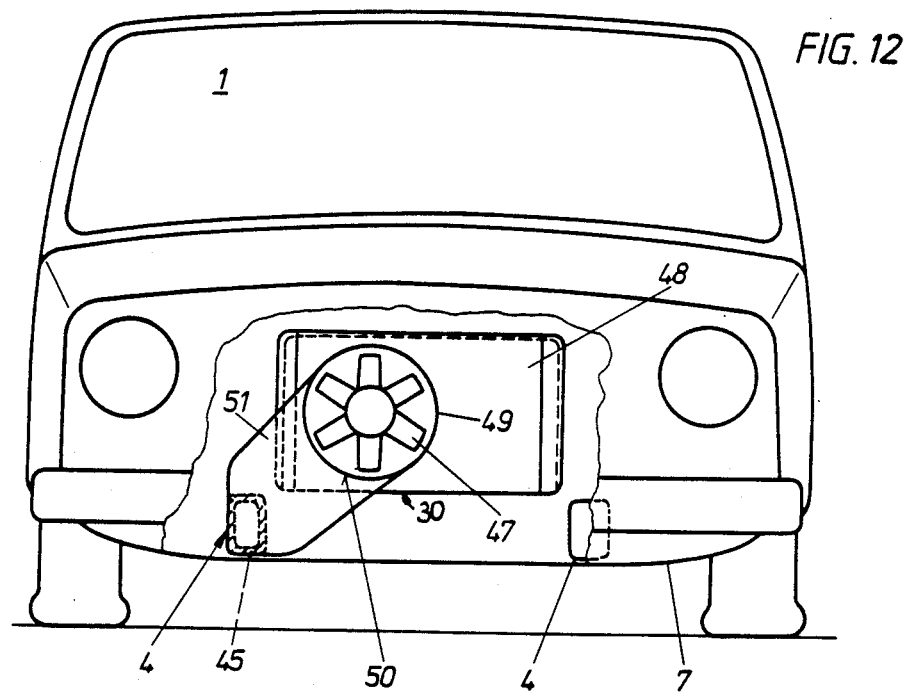
FIG. 12 presents a front view of the vehicle according to FIG. 11.

The motor vehicle presented in FIGS. 11 and 12 again comprises a passenger car is powered by an internal combustion engine 3 which is mounted in an engine compartment 2 at the front of the car. The engine compartment 2 is completed by additional encapsulating components, e.g., the bottom 7 and the front baffle plate 8, which are sealed against such parts of the frame or body as the longitudinal subframe beams 4 or the wheel-guard covers 5, to form an enclosed sound-insulating capsule 9. The capsule 9 has inlet openings 10′, 10‴ and outlet openings now shown here, which are insulated in order to prevent the escape of air-borne sound and are used for ventilation of the capsule.

The front cross-member of the vehicle which is not shown here in detail, is provided with a wide intake opening which is open in the forward direction and feeds cooling air via openings not shown—into the beams 4, or rather, in the variant shown, into the beam 4 on the left side (facing forwards), when the vehicle is in motion, i.e., by utilizing the effect of dynamic pressure at the intake opening. The inlet opening 10′ is at the end of a piece of pipe 43 issuing from the beam 4, thus providing for a directed flow of cooling air towards points of the internal combustion engine or its auxiliary assemblies requiring special cooling.

The inlet opening 10‴ on the right-hand side of the vehicle 1 (facing forwards) is also situated at the end of a piece of pipe 43 issuing from the corresponding beam 4, although in this case the beam 4 is not connected to the cross-member and is therefore not exposed to dynamic pressure.

For forced ventilation of the interior of the capsule 9 in operational states of the vehicle in which the cooling requirements for the capsule interior cannot be met by the dynamic pressure developed at the front of the vehicle, the present variant provides for a connection between the air intake duct 49 located between the fan 47 in front of the radiator 48 (as seen if facing forwards) and the radiator 48 itself, and the longitudinal subframe beam 4, which is established by an inlet pipe 51 originating at a side opening 50 of the air intake duct 49.

The fan 47 is driven by an electromotor 53 which may be turned on and off in a conventional manner via a thermostat control, depending on the particular operational state of the combustion engine (e.g. via the temperature of the cooling water). At points of the combustion engine 3 or its auxiliary assemblies requiring special cooling—e.g. in the area of the generator or the injection pump—a temperature sensor 52 may be positioned which is connected to the automatic ON/OFF switch of the electromotor 53 (in a manner not shown here) such that, in addition to the temperature sensor in the cooling water, the fan 47 is turned on or off when a given temperature is exceeded in the vicinity of the sensor 52.

This arrangement will ensure in a simple manner and without the need for an additional fan for ventilation of the capsule, that in case of insufficient dynamic pressure the capsule is force-ventilated by means of a temperature-controlled fan, largely utilizing existing components (e.g., fan, air intake duct, subframe beams).

It should be pointed out that in the variant shown here the interior of the beam 4 between the inlet pipe 51 and the pipe piece 43 ending in the inlet opening 10‴ is provided with a sound-absorbing lining 45, which will further lower the level of noise emanating from the sound-insulating capsule 9.

Furthermore, it should be noted that the paths for the air-flow into the capsule 9 generated by dynamic pressure which are independent of the side-opening 50 or the inlet pipe 51, may be provided with back valves, e.g., spring-loaded flaps, rubber flaps, etc., which will prevent any unwanted backflow of cooling air from the force-ventilated capsule via these flow paths. Such a flap 44 is indicated by a broken line at the inlet opening 10′ in FIG. 11; moreover, such devices could also be provided within the flow paths for ventilation by dynamic pressure, or at the intake opening of the front cross-member.

We claim:

1. A motor vehicle, comprising a frame and body components, an engine compartment, a water-cooled internal combustion engine mounted in said engine compartment to power the vehicle, encapsulating elements sealed against parts of said frame and said body components to form a completely enclosed sound-insulating capsule for said engine compartment, said capsule including sound-absorbing inlet and outlet openings for ventilation of said capsule, means for blower ventilating said capsule, said blower ventilating means comprising a blower and a first cooling air inlet passage connected thereto, said first cooling air inlet passage terminating in one of said inlet openings, another of said inlet openings being provided with a second cooling air inlet passage separate from said blower ventilating means and having an associated intake opening, said intake opening being located in one of said body components so as to be exposed to external dynamic pressure developing during movement of the vehicle.

2. A motor vehicle according to claim 1, wherein said engine is mounted at the front end of said frame, said body components including longitudinal subframe beams and a front cross-member connecting front ends of said beams, said subframe beams being interconnected with selected ones of said encapsulating elements, said intake opening being located in said front cross-member and opening in the direction of vehicle movement, said second cooling air inlet passage including an essentially closed intake housing provided with a sound-absorbing lining, and said second cooling air inlet passage including at least one of said subframe beams in open communication with said housing and terminating in said intake opening.

3. A motor vehicle according to claim 2, wherein at least one of said inlet openings is directed toward parts of said engine requiring special cooling.

4. A motor vehicle according to claim 2 wherein said second inlet passage has a back valve for preventing escape of cooling air from said capsule when internal capsule pressure exceeds said dynamic pressure.

5. A motor vehicle according to claim 4, wherein said back valve comprises a spring-loaded flap.

6. A motor vehicle according to claim 2, wherein said engine is transversely mounted, and said ventilating means comprises a separate blower for ventilating said capsule, said passage further including another of said beams in open communcation with said housing and having a further inlet opening, said blower being located at said further opening and being powered at least indirectly by said engine.

7. A motor vehicle according to claim 2, further including an egine cooling assembly comprising a radiator and a fan, a thermostatic control device, said fan being spaced from and located in front of said radiator in the direction of vehicle movement, and said fan being thermostatically controlled by said device and driven independently of the prevailing operational conditions of said engine, another of said inlet openings comprising another separate cooling air inlet passage having another intake opening, said another passage opening into a side space between said fan and said radiator, and said another passage including another of said beams in open communication with said housing.

8. A motor vehicle according to claim 7, wherein at least one of said air inlet openings has a back valve.

9. A motor vehicle according to claim 7, further comprising at least one temperature sensor located within said capsule in an area requiring special cooling, said sensor being operatively connected to said fan for controlling said fan when a predetermined temperature is exceeded in said area.

10. A motor vehicle according to claim 1, wherein said second inlet passage has a back valve for preventing escape of cooling air from said capsule when internal capsule pressure exceeds said dynamic pressure.

11. A motor vehicle according to claim 10, wherein said back valve comprises a spring-loaded flap.

* * * * *